United States Patent [19]

Tassone

[11] Patent Number: 4,473,521
[45] Date of Patent: Sep. 25, 1984

[54] METHOD AND APPARATUS FOR MAKING A POLYMERIC COATED FABRIC LAYER

[75] Inventor: Joseph V. Tassone, Kettering, Ohio
[73] Assignee: Dayco Corporation, Dayton, Ohio
[21] Appl. No.: 489,924
[22] Filed: Apr. 29, 1983
[51] Int. Cl.³ .............................................. B29G 5/00
[52] U.S. Cl. .............................. 264/136; 264/289.3; 425/90; 427/176; 427/389.9
[58] Field of Search ................ 264/136, 288.8, 289.3; 425/90, 112; 427/176, 356, 389.9

[56] References Cited
U.S. PATENT DOCUMENTS

| | | | |
|---|---|---|---|
| 1,975,195 | 10/1934 | Dennison | 427/176 |
| 3,723,438 | 3/1973 | Fairbanks | 264/288.8 |
| 3,784,427 | 1/1974 | Griffin | 427/176 |
| 3,844,813 | 10/1974 | Leonard et al. | 427/176 |
| 4,062,989 | 12/1977 | Long | 427/176 |

Primary Examiner—Donald E. Czaja
Assistant Examiner—Willie Thompson
Attorney, Agent, or Firm—Joseph V. Tassone

[57] ABSTRACT

A method and apparatus for making a polymeric coated fabric layer is provided, the method comprising the steps of providing a fabric layer having warps and fills initially woven at a certain angle relative to each other, then changing the certain angle to another angle by stretching the fabric layer in one direction thereof whereby the fabric layer is in an altered condition thereof, disposing a liquid polymeric coating on at least one side of the fabric layer while the same is in the altered condition, doctoring the coating, further stretching the fabric layer in the one direction after the step of disposing the coating thereon, and drying the coating with a heating unit to at least a degree thereof that will hold the fabric layer in substantially the altered condition thereof, the step of doctoring the coating taking place after the step of further stretching the fabric layer and the step of further stretching the fabric layer taking place after the heating unit has dried the coating to at least a degree thereof that the further stretching of the fabric layer causes an outward thickening of the coating on the one side of the fabric layer.

24 Claims, 8 Drawing Figures

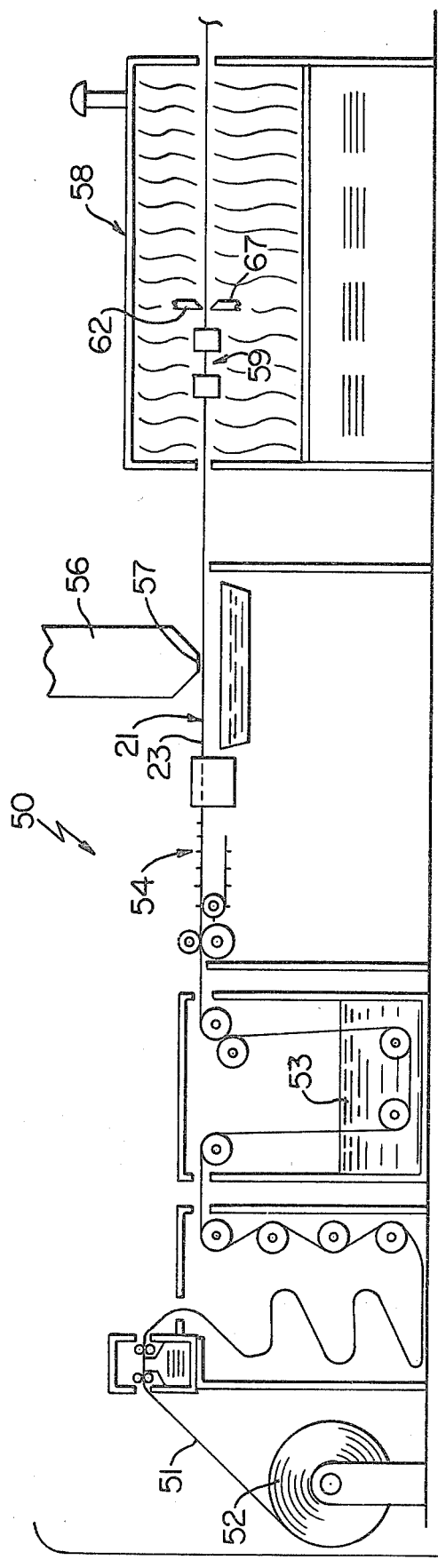
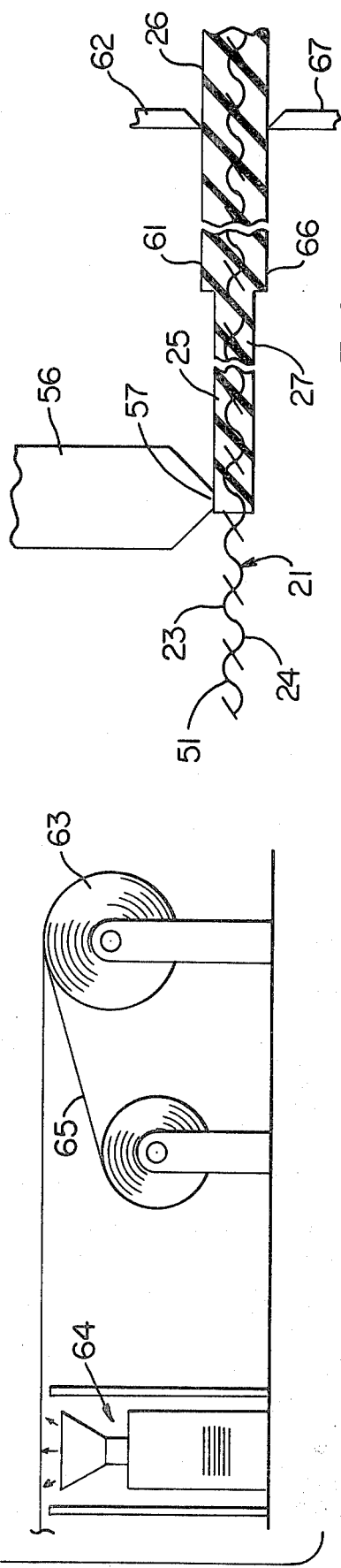
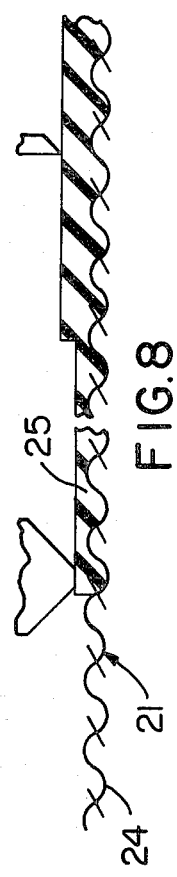
FIG. 6
FIG. 7
FIG. 8

METHOD AND APPARATUS FOR MAKING A POLYMERIC COATED FABRIC LAYER

BACKGROUND OF THE INVENTION

1. Field of the Invention

This invention relates to an improved method and apparatus for making a polymeric coated fabric layer means for making a polymeric product, such as a belt construction or the like.

2. Prior Art Statement

It is known to provide a method and apparatus for making a polymeric coated fabric layer means wherein the method comprises the steps of providing a fabric layer having warps and fills initially woven at a certain angle relative to each other, then changing the certain angle to another angle by stretching the fabric layer in one direction thereof whereby the fabric layer is in an altered condition thereof, disposing a liquid polymeric coating on at least one side of the fabric layer while the same is in the altered condition, doctoring the coating, further stretching the fabric layer in one direction after the step of disposing the coating thereon, and drying the coating with a heating means to at least a degree thereof that will hold the fabric layer in substantially the altered condition thereof. For example, see the copending patent application of Delmar D. Long, Ser. No. 350,969, filed Feb. 22, 1982. Also see, the U.S. Pat. No. 3,784,427, to Griffin, and the U.S. Pat. No. 4,062,989 to Long.

SUMMARY OF THE INVENTION

It is one feature of this invention to provide an improved method and apparatus for making a polymeric coated fabric layer means for making a polymeric product, such as a belt construction and the like.

It is believed according to the teachings of this invention that an improved method and apparatus for making a polymeric coated fabric layer means will be provided if a single coating means can be utilized in such a manner that sufficient polymeric material will be provided to produce the desired thickness of polymeric material on the completed polymeric coated fabric layer means without requiring additional coatings to be applied thereto by additional coating means whereby it is believed that the method and apparatus would be less costly to produce and/or operate.

Therefore, it is believed according to the teachings of this invention that a single liquid coating of polymeric material can be provided on the fabric layer means by a single coating means and that such coating cann be dried to a certain degree thereof so that further stretching of the fabric layer in one direction will cause an outward thickening of that coating from the fabric layer to provide a coating with sufficient thickness, the coating then being adapted to be doctored so as to provide a smooth outer surface which will be sufficient for the intended use of such polymeric coated fabric layer means.

For example, one embodiment of this invention provides a method of making a polymeric coated fabric layer means comprising the steps of providing a fabric layer having warps and fills initially woven at a certain angle relative to each other, then changing the certain angle to another angle by stretching the fabric layer in one direction thereof whereby the fabric layer is in an altered condition thereof, disposing a liquid polymeric coating on at least one side of the fabric layer while the same is in the altered condition, doctoring the coating, further stretching the fabric layer in the one direction after the step of disposing the coating thereon, and drying the coating with a heating means to at least a degree thereof that will hold the fabric layer in substantially the altered condition thereof, the step of doctoring the coating taking place after the step of further stretching the fabric layer and the step of further stretching the fabric layer taking place after the heating means has dried the coating to at least a degree thereof that the further stretching of the fabric layer causes an outward thickening of the coating from the one side of the fabric layer.

Accordingly, it is an object of this invention to provide an improved method of making a polymeric coated fabric layer means, the method of this invention having one or more of the novel features of this invention as set forth above or hereinafter shown or described.

Another object of this invention is to provide an improved apparatus for making a polymeric coated fabric layer means, the apparatus of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 6 is a schematic side view of the method and apparatus illustrated in FIG. 5.

FIG. 7 is an enlarged schematic side view of certain parts of the method and apparatus of FIGS. 5 and 6.

FIG. 8 is a view similar to FIG. 7 and illustrates another embodiment of the method and apparatus of this invention.

DESCRIPTION OF THE PREFERRED EMBODIMENTS

Figure 1:
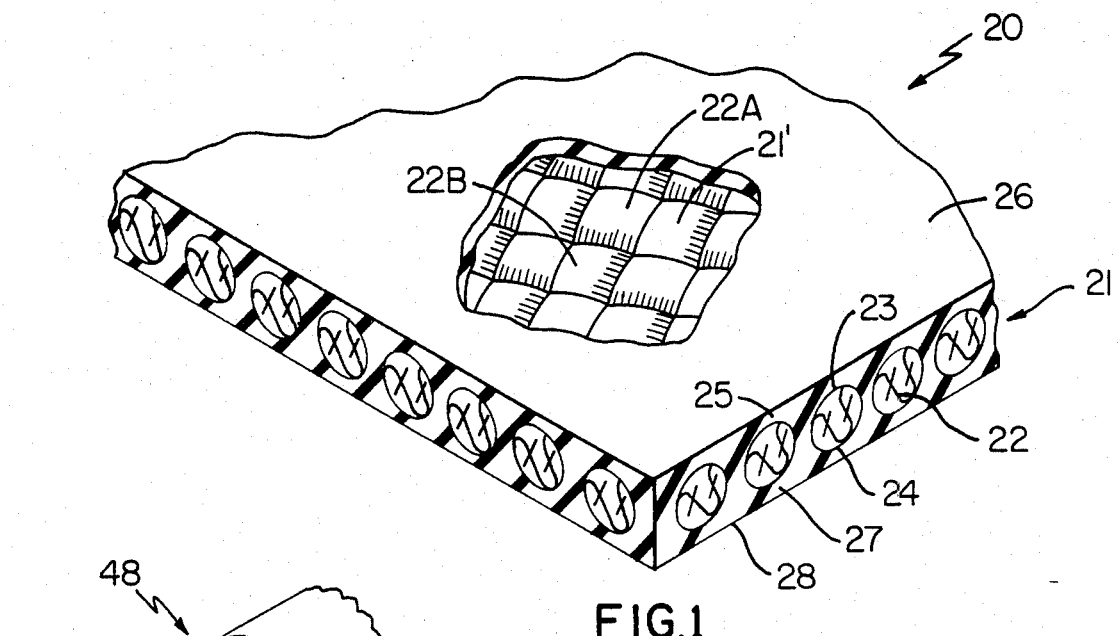
FIG. 1 is an enlarged, broken away, cross-sectional schematic and perspective view of the improved polymeric coated fabric layer means of this invention.

While the various features of this invention are hereinafter illustrated and described as being particularly adapted to provide a polymeric coated fabric layer means for making particular products, it is to be understood that the various features of this invention can be utilized singly or in various combinations thereof to provide a polymeric coated fabric layer means for other uses and/or other products as desired.

Therefore, this invention is not to be limited to only the embodiments illustrated in the drawings, because the drawings are merely utilized to illustrate some of the wide variety of uses of this invention.

Referring now to FIG. 1, the improved polymeric coated fabric layer means of this invention is generally indicated by the reference numeral 20 and comprises a suitable fabric layer 21 having thread means 22 disposed in a certain pattern thereof for the purpose hereinafter set forth and having opposed sides 23 and 24.

A layer 25 of polymeric material is secured to the side 23 of the fabric layer 21 in a manner hereinafter set forth and has an outer substantially flat surface 26, the polymeric layer 25 of this invention comprising any suitable polymeric material, such as a latex.

Another layer 27 of any suitable polymeric material, such as a latex, can be secured to the other side 24 of the fabric layer 21 so as to define a substantially flat outer surface 28 thereof which is adapted to be subsequently secured to a surface of a desired polymeric product, such as a belt body or the like.

While the layer 27 can comprise a layer separate from the layer 25, it is to be understood that the layer 27 can comprise part of the layer 25 that has exuded through the fabric layer 21 as will be apparent hereinafter.

In any event, and if desired, the surface 28 of the layer 26 can be provided with an additional tacky polymeric layer for the aforementioned securement purpose as fully set forth in the aforementioned copending patent application of Delmar D. Long, Ser. No. 350,969, filed Feb. 22, 1982. Since this copending patent application and the two aforementioned U.S. Pat. Nos. 3,784,427-Griffin and 4,062,989-Long, describe the various uses of polymeric coated fabric layer means and methods and apparatus for making the same which are similar to this invention as will be apparent hereinafter, this copending patent application and these two U.S. patents are being incorporated into this disclosure by this reference thereto.

One such use of the polymeric coated fabric layer means 20 of this invention is to provide a reinforcing surface for a belt construction. For example, reference is now made to FIG. 2 wherein a polymeric product of this invention is generally indicated by the reference numeral 30 and comprises an endless power transmission belt of a typical "V" type wherein the polymeric body 31 thereof has a substantially trapezoidal cross-sectional configuration defined by a pair of opposed flat parallel top and bottom surfaces 32 and 33 with a pair of angled side surfaces 34 and 35 disposed therebetween, the belt construction 30 having the conventional tension section 36, compression section 37 and load carrying section 38 disposed intermediate the tension section 36 and compression section 37 with the sections 36, 37 and 38 being made mainly of polymeric material in a manner well known in the art.

As is conventional in the art, the opposed angular surfaces 34 and 35 of the belt construction 30 are each adapted to have a friction layer, that comprises a fabric impregnated with polymeric composition, secured thereon by such friction layer either being disposed only on the surfaces 34 and 35 thereof or by having the entire outside surface of the belt body 31 wrapped with the friction layer, the friction layer being secured to the belt body 31 during a subsequent heat curing or vulcanizing operation.

Figure 2:
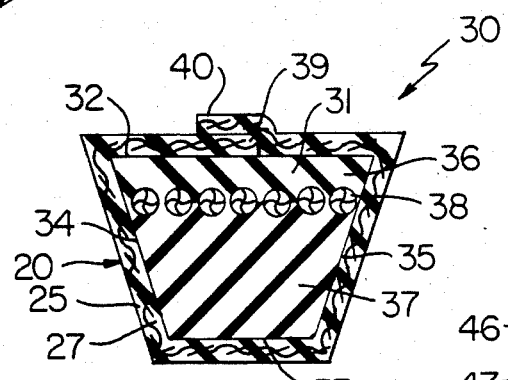
FIG. 2 is a cross-sectional view of an endless power transmission belt construction and the like utilizing the polymeric coated fabric layer means of this invention that is illustrated in FIG. 1.

In any event, it can be seen that the belt construction 30 illustrated in FIG. 2 is completely wrapped by the fabric strip or layer means 20 of this invention so that the opposed ends 39 and 40 of the layer means 20 are disposed and secured in overlapping relation, such as on the top surface 32 of the belt construction 20 as illustrated in FIG. 2 and is conventional in the belt making art.

When utilizing the layer means 20 of the invention for forming the belt construction 30 of FIG. 2, it can be seen that the layer 27 of the layer means 20 is disposed in contact with the outer surfaces 32, 33, 34 and 35 of the polymeric body 31 of the belt construction so as to readily conform to and be secured to such surfaces 32, 33, 34 and 35 during a subsequent heat curing or vulcanizing of the belt construction 30 after the fabric layer means 20 of this invention has been wrapped on the belt bod 31 in a manner well known in the art of making belt constructions.

As illustrated in FIG. 2, the outer layer 25 of the fabric layer means 20 provides the contact facing of the belt construction 30 at the drive or driven sides 34 and 35 thereof as is conventional in the art.

Figure 3:
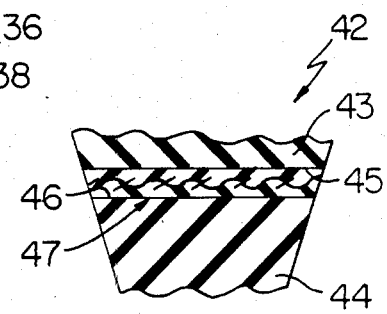
FIG. 3 is a fragmentary view similar to FIG. 2 and illustrates another type of belt utilizing the polymeric coated fabric layer means of FIG. 1.

While the fabric layer means 20 of this invention has been previously described as forming an outside surface of a belt product, it is to be understood that the layer means 20 of this invention can provide not only an outside surface thereof, but also in addition thereto or in lieu thereof can form part of an inner layer of the belt product if desired. For example, reference is now made to FIG. 3 wherein another polymeric belt body or product 42 of this invention is provided and comprises a pair of polymeric layers 43 and 44 respectively having facing sides 45 and 46 being secured to each other by a strip 47 of the layer means 20 of this invention that is disposed intermediate the polymeric layers 43 and 44 and being secured thereto during a subsequent heat curing or vulcanizing of the belt body 43 in a manner well known in the art in making belt constructions.

Also, while the polymeric coated fabric layer means 20 of this invention has previously been described as forming a part or parts of a belt construction or the like, it is to be understood that there are other products than can utilize the layer means 20 of this invention by itself or as a part thereof.

Figure 4:
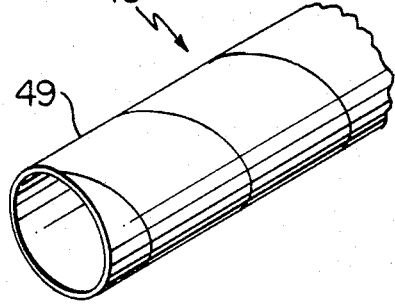
FIG. 4 is a fragmentary perspective view illustrating another product of this invention utilizing the polymeric coated fabric layer means of FIG. 1.

For example, the layer means 20 of this invention can provide a hose construction that is generally indicated by the reference numeral 48 in FIG. 4 by having an elongated strip 49 of the layer means 20 of this invention helically wrapped and secured in overlapping relation in a manner well known in the hose construction art to provide the hose construction 48 together with or without additional wire reinforcing means as desired.

Further, it is to be understood that the fabric layer means 20 of this invention can provide part of a printing blanket, gasket means, etc. whereby it can be seen that the layer means 20 of this invention can be utilized as a product itself or with other products not disclosed in this application because it is believed that the same is readily adapted to be utilized where any such fabric layer means is presently being used or where such a fabric layer means could possibly be used.

As previously stated, it is one feature of this invention to provide an improved method and apparatus for making the polymeric coated fabric layer means 20 illustrated in FIG. 1 by utilizing only a single coating means and still provide at least the layer 25 of the side 23 of the fabric layer means 21 with a sufficient thickness for the intended uses of the layer means 20 as previously set forth. However, it is to be understood that additional layers of polymeric material can be disposed on the layer 25 of the fabric layer means 20 of this invention, if desired.

One method and apparatus of this invention that is believed to be adapted for making the fabric layer means 20 previously described in generally indicated by the reference numeral 50 in FIGS. 5 and 6 and will now be described, the method and apparatus 50 being substantially the same as the method and apparatus set forth in the aforementioned copending patent application Ser. No. 350,969, filed Feb. 22, 1982, except that only a single coating means is provided and the doctor means, heating means and stretching means is arranged differently in order to produce the unique features of this invention as will be apparent hereinafter.

Figure 5:
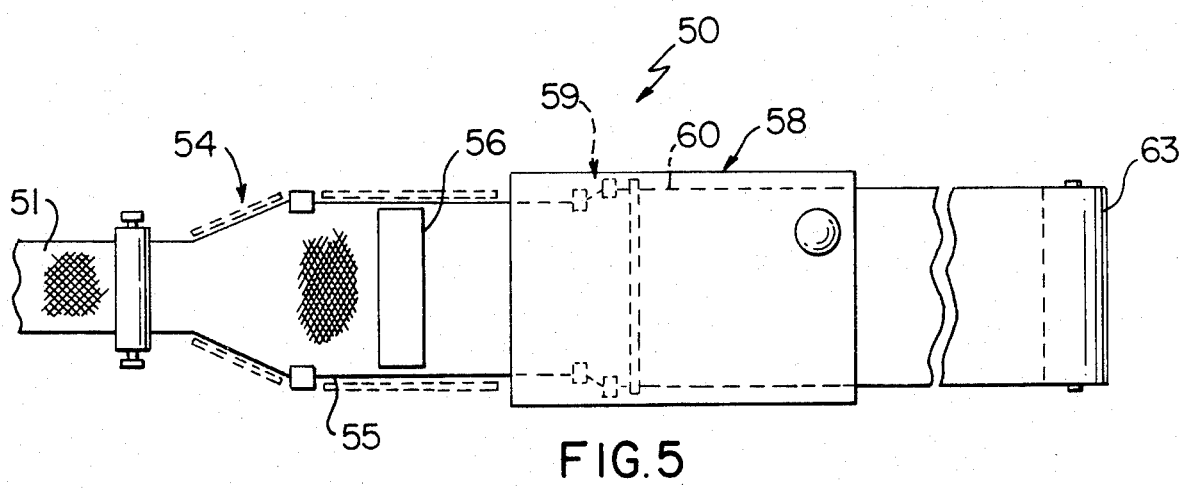
FIG. 5 is a schematic top view of the method and apparatus of this invention utilized to produce the polymeric coated fabric layer means of this invention that is illustrated in FIG. 1.

As illustrated in FIG. 6, a woven fabric strip 51 in an unaltered condition thereof is fed from a supply roll 52 thereof through a liquid 53 that impregnates and lubricates the threads thereof so that the same can be readily stretched on a tenter frame that is generally indicated by the reference numeral 54 in FIGS. 5 and 6 and is of a type similar to the tenter frame set forth in the aforementioned copending patent application and U.S. patents as well as in the U.S. Pat. No. 4,238,530 to Hollaway et al., whereby this U.S. Patent to Hollaway et al. is being incorporated into this disclosure by this reference thereto.

As is well known in the art, the tenter frame 54 stretches the fabric layer 51 in a direction transverse to the longitudinal direction of movement of the fabric strip 51 through the apparatus 50 so that the woven angle of the thread means 26 of the fabric layer 21 is altered from the initial woven condition thereof to a wide angle relationship between the warps and fills thereof. For example, the woven fabric material 21 normally is woven so that the warps 22A and fills 22B (FIG. 1) thereof are disposed at an angle of 90° relative to each other with the woven material 21 being cut and arranged so that the warps and fills are disposed on a bias, such as an angle of 45° relative to the longitudinal axis of the strip 51 as the same passes through the apparatus 50. The tenter frame 54 is arranged to alter the angle between the warps 22A and fills 22B of the strip 21 so that the same make a larger angle than the original woven angle of 90° thereof. For example, such alterd angle between the warps 22A and fills 22B of the fabric strip 51 can be between approximately 100° to approximately 120° so as to render the resulting fabric strip relatively flexible for its intended purpose as previously set forth and is well known in the art.

The tenter frame 54 stretches the fabric layer 51 in a direction transverse to the direction of movement of the strip 51 through the apparatus 50 so that the same has a new width as indicated by the reference numeral 55 in FIG. 5. At this time, the strip 51 has the liquid polymeric material 25 disposed thereon by a suitable extruding or coating apparatus 56 disposed above the strip 51 and having an open end 57 through which the liquid polymeric material 25 is disposed on the side 23 of the altered fabric layer 21 as illustrated in FIG. 6 and schematically in FIG. 7, the consistency of the polymeric material 25 exuding from the single coating apparatus 56 being sufficiently liquid to fully impregnate the fiber bundles 21' (FIG. 1) of the fabric layer 21 in the manner set forth in the aforementioned copending patent application Ser. No. 350,969, filed Feb. 22, 1982.

In such copending patent application, the coating is immediately doctored and then the fabric layer is further outwardly stretched by the tenter frame to make sure the fabric layer is taut before the fabric layer enters a heating unit to have the coating dried thereon.

In contrast, it is applicant's belief that the coating 25 on the side 23 of the fabric layer 51 should be dried by the heating unit to at least a degree thereof that the further outward stretching of the fabric layer 51 will cause the coating 25 thereon to thicken outwardly from the side 25 of the fabric layer 21 so as to provide a coating of a thickness thereon that does not require additional coatings to be applied thereto.

For example, the strip 51 after the coating 25 has been applied thereon by the coating apparatus 56 is fed into a heating unit 58 that comprises a heated air heating unit that heats the coating 25 to cause the same to start to dry whereby the tenter frame 54 then outwardly further stretches the coated fabric layer 51 in the area of the reference numeral 59 in FIGS. 5 and 6 so that the coated fabric layer 51 now has a width as indicated by the reference numeral 60 in FIG. 5. At this time, it is believed that the coating 25 will have thickened outwardly from the side 23 of the fabric layer 21 as represented by the reference numeral 61 in FIG. 7 due to the fact that the further outward stretching of the fabric layer causes the fiber bundles 21' to be further pulled tighter together to force the polymeric material disposed between the same outwardly to form the thickened area 61 as illustrated in FIG. 7.

The coating 25 can now be doctored by a suitable doctor means 62 that is disposed in the oven 58 in order to provide the smooth outer surface 26 on the coating 25 which is further dried by the heating unit 58 to at least a degree thereof that will cause the coating 25 to hold the thread means 22 of the fabric layer 21 in the altered condition thereof when the strip 20 now exits from the heating means 58 to be wound into a supply roll 63 as illustrated in FIG. 6.

If desired, the strip 20 can be cooled by a cooling apparatus 64 before the strip is wound into the supply roll 63 and, if desired, a strip 65 can be interwoven with the strip 20 as the same is wound into the supply roll 63 so as to prevent the strip 20 from securing to itself in the supply roll 63 in a manner well known in the art.

Therefore, it can be seen that it is believed according to the teachings of this invention that the single coating device 56 will provide a sufficient amount of the polymeric material 25 onto the altered fabric layer 21 to produce a coating 25 of a sufficient thickness in the final form thereof so that an additional coating need not be applied thereon as in prior known apparatus and methods.

In addition, it is also believed according to the teachings of this invention that if the weave of the fabric layer 21 in the altered condition thereof is sufficiently loose, some of the material 25 being applied by the single coating device 56 will exude through the thread means 22 so as to extend out of the other side 24 of the fabric layer 21 to form the coating 27 as illustrated in FIG. 7. If so, then the further outward stretching of the fabric layer 21 by the tenter frame 54 in the area of the reference numeral 59 after the heating means 58 has partially dried the coating material 25, 27, will also cause the coating material 27 on the lower side 24 of the fabric layer 21 to thicken outwardly from the fabric layer 24 as represented by the reference numeral 66 in FIG. 7 and a suitable doctor 67 can thereafter doctor the same to provide the smooth outer surface 28 on the coating layer 27 in the same manner as the doctor means 62.

Of course, the altered weave of the fabric layer 21 may be so tight that the coating 25 will not exude therethrough whereby the other side 24 of the fabric layer 21 will be substantially free of the coating 27 and have the appearance as illustrated in FIG. 8.

If the strip 20 has the appearance as illustrated in FIG. 8, and it is desired to have the coating 27 on the side 24 thereof, it is to be understood that a coating of polymeric material can be applied to the side 24 by any suitable apparatus as desired.

In any event, it can be seen that the method and apparatus 50 of this invention is adapted to provide a coating on at least one side of the fabric layer means 21 while the same is in the altered condition thereof by utilizing a single coating apparatus 56 as the coating can be thereafter outwardly thickened relative to that side of the fabric layer 21 by heating the coating so that the same is dried to a degree that will cause the outward thickening thereof when the fabric layer is further outwardly stretched whereby additional coating apparatus need not be provided in this method and apparatus of this invention.

As previously set forth, it is believed according to the teachings of this invention that the further outward stretching of the fabric layer, after the coating has been dried to a certain degree thereof, causes the coating thereon to outwardly thicken because of the fiber bundles being drawn closer together to force the coating therebetween and therein outwardly. In addition, it is believed that in certain types of fabrics, such further outward stretching will reduce the cross-sectional thickness of the fabric layer itself, particularly at the cross over points of the woven strands thereof to cause the coating material that has impregnated therein and/or carried thereby to exude outwardly therefrom and thereby cause the outward thickening of the coating. In the same vein, it may be found that certain fabrics when further outwardly stretched have the cross-sectional thickness thereof changed not only at the cross over points thereof but also in the cross-sectional thickness of the strand or thread means thereof so that the reduction in the cross-sectional thickness will cause the coating material that has impregnated therein to outwardly exude therefrom and thereby cause the thickening of the coating on the particular side of the fabric material. Also, it might be found that when the fabric material is being fed onto the tenter frame the same can be overfed thereon, as well known in the art, so that during the further outward stretching of the fabric material, the overfed material thins out or has its cross-sectional thickness reduced so that an outward thickening of the coating thereon will result. Of course, it is to be understood that there may be other reasons why the coating might outwardly thicken during such further outward stretching of the fabric means.

In any event, it is also believed according to the teachings of this invention that the fabric layer can be any suitable fabric layer which will permit the further stretching thereof to cause the coating to outwardly thicken in the manner previously set forth. For example, it is believed that the fabric layer can comprise one or more layers of material that has been woven, such as with a plain weave, a twill weave, or a stain weave, been knitted, double knitted, etc. or been formed as a non-woven material, such as where the strand means thereof are disposed on top of each other at desired angles. Also, such fabric layer might comprise various combinations of such outwardly stretchable materials, as desired.

Therefore, it can be seen that this invention provides an improved method and apparatus for making a polymeric coated fabric layer means.

While the forms and methods of this invention now preferred have been illustrated and described as required by the Patent Statute, it is to be understood that other forms and method steps can be utilized and still fall within the scope of the appended claims.

What is claimed is:

1. In a method of making a polymeric coated fabric layer means comprising the steps of providing a fabric layer having warps and fills initially woven at a certain angle relative to each other, then changing said certain angle to another angle by stretching said fabric layer in one direction thereof whereby said fabric layer is in an altered condition thereof, disposing a liquid polymeric coating on at least one side of said fabric layer while the same is in said altered condition, doctoring said coating, further stretching said fabric layer in said one direction after said step of disposing said coating thereon, and drying said coating with a heating means to at least a degree thereof that will hold said fabric layer in substantially said altered condition thereof, the improvement wherein said step of doctoring said coating takes place after said step of further stretching said fabric layer and wherein said step of further stretching said fabric layer takes place after said heating means has dried said coating to at least a degree thereof that the further stretching of said fabric layer causes an outward thickening of said coating from said one side of said fabric layer.

2. A method as set forth in claim 1 wherein said step of disposing said liquid polymeric coating on said one side of said fabric layer comprises the step of using a single coating means to apply said liquid polymeric coating against said one side of said fabric layer.

3. A method as set forth in claim 2 wherein said step of using said single coating means causes said liquid polymeric coating to exude through said fabric layer so as to provide a coating of polymeric material on the other side of said fabric layer.

4. A method as set forth in claim 3 and including the step of doctoring said coating of polymeric material on said other side of said fabric layer after said step of further stretching said fabric layer.

5. In a method of making a polymeric coated fabric layer means comprising the steps of providing a fabric layer having warps and fills initially woven at a certain angle relative to each other, then changing said certain angle to another angle by stretching said fabric layer in one direction thereof whereby said fabric layer is in an altered condition thereof, disposing a liquid polymeric coating on at least one side of said fabric layer while the same is in said altered condition, further stretching said fabric layer in said one direction after said step of disposing said coating thereon, and drying said coating with a heating means to at least a degree thereof that will hold said fabric layer in substantially said altered condition thereof, the improvement wherein said step of further stretching said fabric layer takes place after said heating means has dried said coating to at least a degree thereof that the further stretching of said fabric layer causes an outward thickening of said coating from said one side of said fabric layer.

6. A method as set forth in claim 5 wherein said step of disposing said liquid polymeric coating on said one side of said fabric layer comprises the step of using a single coating means to apply said liquid polymeric coating against said one side of said fabric layer.

7. A method as set forth in claim 6 wherein said step of using said single coating means causes said liquid polymeric coating to exude through said fabric layer so as to provide a coating of polymeric material on the other side of said fabric layer.

8. A method as set forth in claim 7 wherein said step of further stretching said fabric layer also causes an outward thickening of said coating from said other side of said fabric layer.

9. In a method of making a polymeric coated fabric layer means comprising the steps of providing a fabric layer having warps and fills initially woven at a certain angle relative to each other, then changing said certain angle to another angle by stretching said fabric layer in one direction thereof whereby said fabric layer is in an altered condition thereof, disposing a liquid polymeric coating on at least one side of said fabric layer while the same is in said altered condition, doctoring said coating, further stretching said fabric layer in said one direction after said step of disposing said coating thereon, and drying said coating to at least a degree thereof that will hold said fabric layer in substantially said altered condition thereof, the improvement wherein said step of doctoring said coating takes place after said step of further stretching said fabric layer.

10. A method as set forth in claim 9 wherein said step of disposing said liquid polymeric coating on said one side of said fabric layer comprises the step of using a single coating means to apply said liquid polymeric coating against said one side of said fabric layer.

11. A method as set forth in claim 10 wherein said step of using said single coating means causes said liquid polymeric coating to exude through said fabric layer so as to provide a coating of polymeric material on the other side of said fabric layer.

12. A method as set forth in claim 11 and including the step of doctoring said coating of polymeric material on said other side of said fabric layer after said step of further stretching said fabric layer.

13. In an apparatus for making a polymeric coated fabric layer means comprising means for receiving a fabric layer having warps and fills initially woven at a certain angle relative to each other, means for then changing said certain angle to another angle by stretching said fabric layer in one direction thereof whereby said fabric layer is in an altered condition thereof, means for disposing a liquid polymeric coating on at least one side of said fabric layer while the same is in said altered condition, means for doctoring said coating, stretching means for further stretching said fabric layer in said one direction after said coating has been disposed thereon, and heating means for drying said coating to at least a degree thereof that will hold said fabric layer in substantially said altered condition thereof, the improvement wherein said means for doctoring said coating is adapted to doctor said coating after said stretching means has further stretched said fabric layer and wherein said stretching means is adapted to further stretch said fabric layer after said heating means has dried said coating to at least a degree thereof that the further stretching of said fabric layer will cause an outward thickening of said coating from said one side of said fabric layer.

14. An apparatus as set forth in claim 13 wherein said means for disposing said liquid polymeric coating on said one side of said fabric layer comprises a single coating means that is adapted to apply said liquid polymeric coating against said one side of said fabric layer.

15. An apparatus as set forth in claim 14 wherein said single coating means is adapted to cause said liquid polymeric coating to exude through said fabric layer so as to provide a coating of polymeric material on the other side of said fabric layer.

16. An apparatus as set forth in claim 15 and including means for doctoring said coating of polymeric material on said other side of said fabric layer after said fabric layer has been further stretched.

17. In an apparatus for making a polymeric coated fabric layer means comprising means for receiving a fabric layer having warps and fills initially woven at a certain angle relative to each other, means for then changing said certain angle to another angle by stretching said fabric layer in one direction thereof whereby said fabric layer is in an altered condition thereof, means for disposing a liquid polymeric coating on at least one side of said fabric layer while the same is in said altered condition, stretching means for further stretching said fabric layer in said one direction after said coating has been disposed thereon, and heating means for drying said coating to at least a degree thereof that will hold said fabric layer in substantially said altered condition thereof, the improvement wherein said stretching means is adapted to further stretch said fabric layer after said heating means has dried said coating to at least a degree thereof that the further stretching of said fabric layer will cause an outward thickening of said coating from said one side of said fabric layer.

18. An apparatus as set forth in claim 17 wherein said means for disposing said liquid polymeric coating on said one side of said fabric layer comprises a single coating means that is adapted to apply said liquid polymeric coating against said one side of said fabric layer.

19. An apparatus as set forth in claim 18 wherein said single coating means is adapted to cause said liquid polymeric coating to exude through said fabric layer so as to provide a coating of polymeric material on the other side of said fabric layer.

20. An apparatus as set forth in claim 19 wherein said stretching means for further stretching said fabric layer is adapted to also cause an outward thickening of said coating from said other side of said fabric layer.

21. In an apparatus for making a polymeric coated fabric layer means comprising means for receiving a fabric layer having warps and fills initially wovenat a certain angle relative to each other, means for then changing said certain angle to another angle by stretching said fabric layer in one direction thereof whereby said fabric layer is in an altered condition thereof, means for disposing a liquid polymeric coating on at least one side of said fabric layer while the same is in said altered condition, means for doctoring said coating, stretching means for further stretching said fabric layer in said one direction after said coating has been disposed thereon, and heating means for drying said coating to at least a degree thereof that will hold said fabric layer in substantially said altered condition thereof, the improvement wherein said means for doctoring said coating is adapted to doctor said coating after said stretching means has further stretched said fabric layer.

22. An apparatus as set forth in claim 21 wherein said means for disposing said liquid polymeric coating on said one side of said fabric layer comprises a single coating means that is adapted to apply said liquid polymeric coating against said one side of said fabric layer.

23. An apparatus as set forth in claim 22 wherein said single coating means is adapted to cause said liquid polymeric coating to exude through said fabric layer so as to provide a coating of polymeric material on the other side of said fabric layer.

24. An apparatus as set forth in claim 23 and including means for doctoring said coating of polymeric material on said other side of said fabric layer after said fabric layer has been further stretched.

* * * * *